United States Patent [19]

Condon

[11] Patent Number: 5,360,188
[45] Date of Patent: Nov. 1, 1994

[54] THREADED INSULATOR CLAMP

[75] Inventor: Duane R. Condon, Ramona, Calif.

[73] Assignee: Oatey Co., Cleveland, Ohio

[21] Appl. No.: 982,590

[22] Filed: Nov. 27, 1992

[51] Int. Cl.$^5$ .............................................. F16L 5/00
[52] U.S. Cl. ..................................... 248/56; 24/136 L;
174/152 G
[58] Field of Search ................ 248/56, 27.1, 231.9,
248/27.3; 174/151, 152 G, 152 R, 65 G; 16/2;
285/162, 194, 338

[56] References Cited

U.S. PATENT DOCUMENTS

| | | | |
|---|---|---|---|
| 522,750 | 7/1894 | Brown . | |
| 576,611 | 2/1897 | Post . | |
| 2,195,003 | 3/1940 | Danvers | 174/152 R X |
| 2,560,211 | 7/1951 | Burdick | 248/27.1 X |
| 3,123,662 | 3/1964 | Fink | 174/65 G |
| 3,322,890 | 5/1967 | Kennedy et al. | 174/152 R |
| 3,424,856 | 1/1969 | Coldren . | |
| 3,580,988 | 5/1971 | Orlowski | 248/56 X |
| 3,684,220 | 8/1972 | Logsdon . | |
| 3,983,598 | 10/1976 | Rosán et al. . | |
| 4,275,263 | 6/1981 | Chino | 174/152 R |
| 4,302,035 | 11/1981 | Ochwat . | |
| 4,583,767 | 4/1986 | Hansen . | |
| 4,609,775 | 9/1986 | Moran | 174/152 R |
| 4,808,774 | 2/1989 | Crane | 248/56 X |

5,068,496 11/1991 Favalora .

*Primary Examiner*—Ramon O. Ramirez
*Attorney, Agent, or Firm*—Renner, Otto, Boisselle & Sklar

[57] ABSTRACT

A clamp for use both with sheet metal and softer structural members of a building such as plasterboard or wood to support a pipe or conduit in different size openings through the members, including an exterior tapered surface having helical threads to facilitate screwing of the tapered surface into such different size openings, and a central passage for the conduit. The clamp has a gap through one side along its entire length to permit the clamp to be opened to fit over a pipe or conduit. Diametrically opposite the gap is an internal slot which reduces the cross-section of the clamp to form a hinge. The clamp may also include an oppositely extending exterior smooth tapered surface positioned base-to-base with the threaded tapered surface and resiliently mounted barbs protruding radially outward beyond the smooth tapered surface. A flange extends radially outward from the clamp between the two tapered surfaces, the flange and the resiliently mounted barbs engaging opposite surfaces of the member to secure the clamp in place when the smooth tapered surface is inserted into a hole in the member.

19 Claims, 2 Drawing Sheets

THREADED INSULATOR CLAMP

FIELD OF THE INVENTION

The present invention relates to an insulator clamp for use in supporting conduits or pipes passing through framing members such as studs, wallboard, or other structural elements of a building.

BACKGROUND OF THE INVENTION

In the construction industry it is frequently necessary to pass a conduit or pipe through an opening in a stud or wallboard or other framing member. It is desirable to use a clamp to support the conduit or pipe within such opening, and in the case of water pipes, to reduce water line noise. Previous clamps were quite limited in the size of the opening in which they could be installed. Also such clamps had to be driven into the opening with a hammer or similar such tool, which made them difficult to install especially when the installer had to work in tight quarters.

SUMMARY OF THE INVENTION

The present invention provides a clamp for supporting a conduit or pipe where it penetrates either a metal stud, wood stud, wallboard or other framing member, and in the case of a water pipe, for sound insulation.

In accordance with one aspect of the invention, the clamp includes an external tapered surface that fits different size holes or openings in framing members. Also, such external tapered surface is threaded for ease of screwing into a hole without the need for any tools and the like.

In accordance with another aspect of the invention, the threads are coaxially slotted in one or more places thus providing leading edges which are relieved to facilitate screwing of the clamp into a hole and trailing edges which have square end faces that act as barbs to resist unscrewing of the clamp once installed.

In accordance with another aspect of the invention, finger engaging tabs or grips may be provided on the back side of the clamp for ease of grasping and screwing of the external threaded tapered surface into a hole by hand.

In accordance with another aspect of the invention, the clamp may also include a slightly tapered exterior guide surface facing in a direction opposite the threaded external tapered surface to help guide the clamp into a standard size punched hole in a sheet metal stud. Also, one or more resilient legs having barbs that project radially outwardly beyond the exterior face of the guide surface may be provided for locking the exterior guide surface within slightly varying hole sizes in a metal stud.

In accordance with another aspect of the invention, preferably the clamp has an axial cut which forms a gap running the entire length of the clamp. Also, a relatively thin section is desirably provided diametrically opposite the cut which acts as a hinge so that the clamp may be easily flexed circumferentially, allowing the clamp to be opened to fit over a pipe so that the clamp may be slid axially along the pipe and into a hole in a structural member. Such a clamp may be installed in such a hole without any tools and will be held securely in a variety of materials including metal studs or other sheet metal members as well as softer materials such as wallboard or wood.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principles of the invention may be employed.

DETAILED DESCRIPTION OF THE PREFERRED EMBODIMENTS

Figure 1:
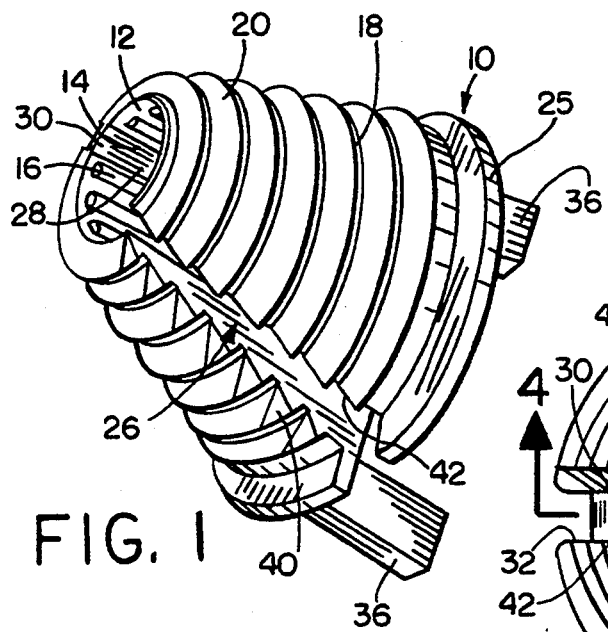
FIG. 1 is a perspective view of one form of threaded insulator clamp in accordance with the present invention.

Referring now in detail to the drawing, and initially to FIGS. 1–4, there is shown one form of clamp 10 in accordance with this invention which may be used to support a pipe or other conduit within a preformed hole or opening in a structural member of a building such as a metal or wooden stud or wallboard. The clamp 10 is desirably slit longitudinally throughout its length to permit the clamp to be opened up and slipped around a pipe or conduit and securely inserted within the opening in the structural member to support the pipe or conduit within the opening and, in the case of a water pipe, to reduce sound transmission without having to use any tools.

Preferably, clamp 10 is molded out of a suitable, resilient plastic resin such as mineral filled polypropylene, and has an interior surface 12 defining an axially extending cylindrical central passage 14 proportioned to accommodate a pipe or conduit, or the like. As an aid to providing sound insulation when the clamp is used in connection with plumbing pipes, e.g., copper tubing, a plurality of circumferentially spaced, axially extending ribs 16 may protrude radially inwardly from the interior surface 12 of the central passage 14. The ribs 16 allow for minimal surface contact between the pipe and insulator clamp thereby reducing transmission of water line noise. Also, the ribs 16 permit air to travel around the pipe for cooling, and allow the pipe to expand and contract freely. In one such clamp the central passage 14 has a diameter of approximately 0.650 inch, and a plurality of ribs 16 protrude radially inwardly approximately 0.025 inch from the interior surface of the central passage so as to accommodate half-inch copper tubing. Of course, other size conduits would require different size clamps.

Figure 4:
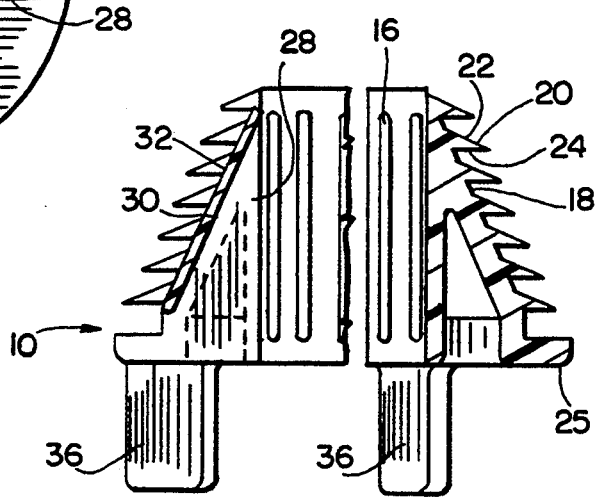
FIG. 4 is a fragmentary longitudinal section through the clamp of FIG. 2 taken generally along the plane of the line 4—4 thereof.

As best seen in FIGS. 1 and 4, the clamp 10 has a tapered exterior surface 18 which forms an angle for example of approximately 24° to the center line of the central passage 14 so that the clamp will fit a number of different size holes in structural members of a building such as metal or wooden studs or wallboard and the like. Also, course helical threads 20 are formed on such exterior tapered surface 18 so that the clamp can easily be screwed into a hole by hand, which is particularly advantageous when the hole is located in tight quarters where there is little or no room to drive the clamp into a hole using a hammer or similar tool.

The threads 20 have a sawtooth profile with leading edges 22 which may be inclined for example at an angle of approximately 65° to the central axis of the clamp 10 and trailing edges 24 (see FIG. 4) that are substantially perpendicular to such central axis. In one form of clamp in accordance with this invention, the threads 20 have a pitch of about eight threads per inch, a thread height of about 0.120 inch, and a spacing between threads at their root diameter of approximately 0.045 inch.

At the radial outermost end of the exterior tapered surface 18 of the clamp 10 is a radial flange 25 which acts as a stop preventing the clamp from being screwed into a hole any further than the flange.

To permit the clamp 10 to be opened to fit over a pipe or other conduit, a gap or cut 26 extends completely through one side of the clamp including the flange 25 along the entire length of the clamp. The clamp 10 thus takes on a C-shape cross-section. In the clamp 10 described above which is proportioned to accommodate half-inch copper pipe, the gap 26 may be approximately 0.200 inch wide before the clamp is opened to fit over a pipe.

Additionally, an internal slot or groove 28 desirably extends the entire axial length of the clamp 10 including the flange 25 diametrically opposite from the cut 26 to form a hinge 30. For a clamp designed to fit half-inch copper tubing, the slot 28 is desirably about 0.200 inch wide, and extends from the central passage 14 radially outward, leaving a web-like hinge 30 about 0.035 inch below the root diameter of the threads 20. To complete the hinge, external slots 32 extend through the threads 20 to the root diameter of the threads and through the flange 25 opposite the internal slot 28. Together the cut 26 and slots 28, 32 assure that the clamp 10 can flex circumferentially to permit the clamp to be opened and placed around a pipe or other conduit prior to being inserted into an opening in a structural member.

On the back side of the flange 25 are one or more axially protruding tabs or finger grips 36 which facilitate manual rotation of the clamp by gripping the tabs between the operator's fingers and thumb for ease of screwing the clamp into a hole. In the embodiment shown in FIGS. 1-4, two such tabs 36 are provided, each located adjacent the outer periphery of the flange 25, one adjacent one side of the gap 26, and the other adjacent the opposite side of the groove 28, substantially diametrically opposite each other. Although the dimensions of the tabs may vary, in one embodiment of the invention designed to fit half-inch copper tubing, each tab is desirably approximately 0.500 inch long, 0.200 inch wide, and 0.300 high.

To install the clamp 10 in a preformed opening in a structural member, the clamp is first opened and placed over the pipe or conduit with the tapered surface 18 facing the opening. The tapered surface 18 of the clamp 10 is next inserted into the opening as far as it will go. Then the installer may grip the tabs 36 between the installer's fingers and thumb for ease of rotating the clamp in the screwing direction so that the helical threads 28 draw the clamp into the opening. As the clamp 10 is screwed into the opening, the exterior tapered surface 18 and the gap 26 cause the clamp to be pressed tight around the conduit.

If the structural member is made of metal, further rotation of the clamp 10 will simply cause the clamp to be pressed more tightly around the conduit. However, if the structural member is made of a softer material such as wood or wallboard, further rotation of the clamp also causes the threads 20 to bite more deeply into the material of the structural member.

Figure 2:
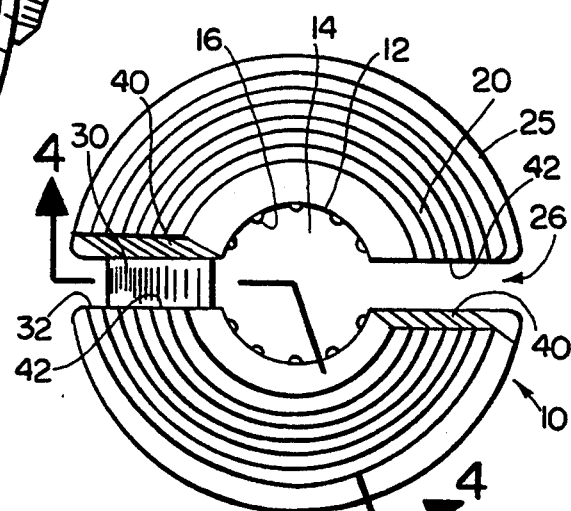
FIGS. 2 and 3 are opposite end views of the clamp of FIG. 1 as seen from the left and right ends of FIG. 1, respectively.
Figure 3:
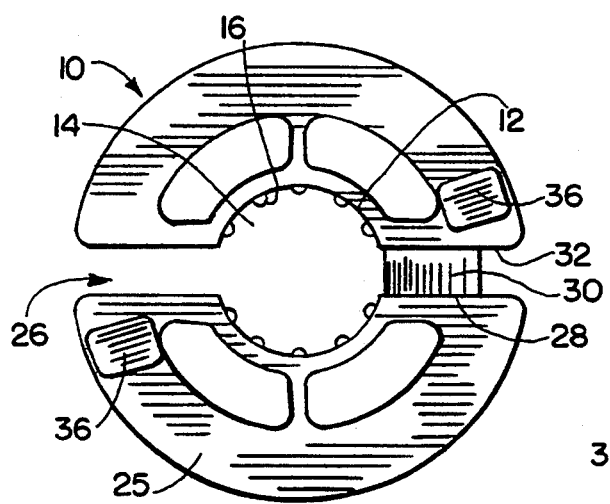

The gap 26 and external slots 32 extending through the helical threads 20 create leading end faces 40 and trailing end faces 42 on the threads (see FIGS. 1 and 2). The leading end faces 40 are relieved or beveled at an angle, for example of approximately 300° the normal sides of the slots 32 and gap 26 so that the threads are self-tapping, whereas the trailing end faces 42 are generally normal to a tangent to the exterior tapered surface of the clamp to provide sharp, biting edges that prevent the clamp from being removed by coming unscrewed and bite into the structural member to resist extraction of the clamp.

Figure 5:
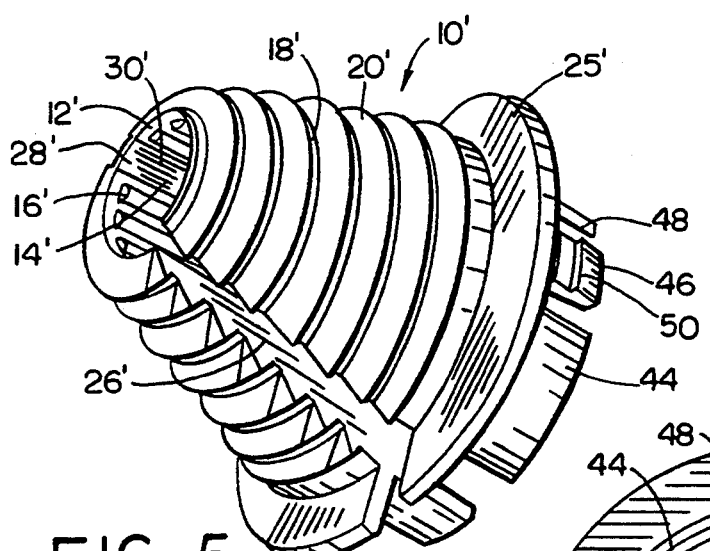
FIG. 5 is a perspective view of another form of threaded insulator clamp in accordance with this invention.
Figure 6:
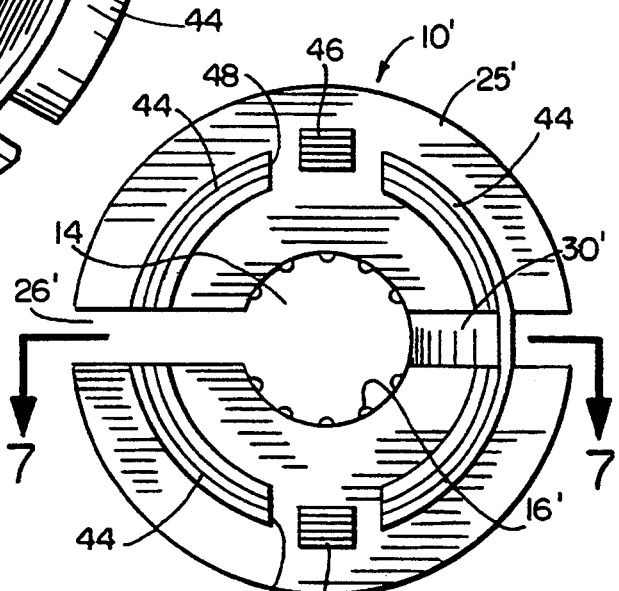
FIG. 6 is an end view of the clamp of FIG. 5 as seen from the right end thereof.
Figure 7:
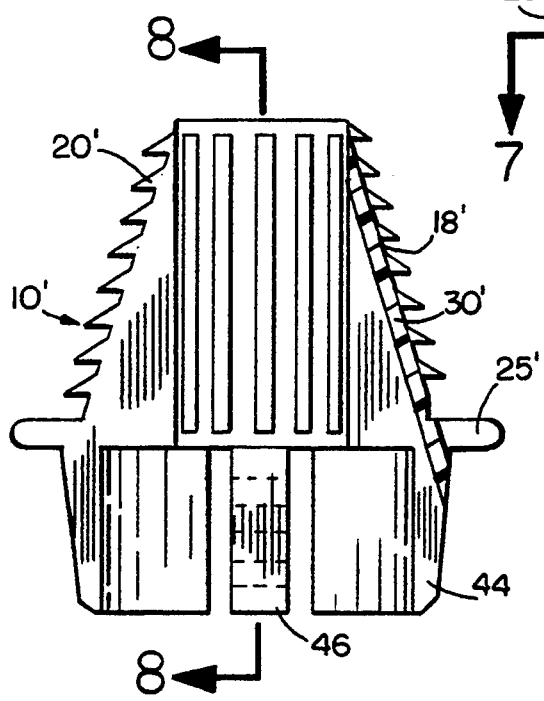
FIG. 7 is a longitudinal section through the clamp of FIG. 6 taken generally along the plane of the line 7—7 thereof.
Figure 8:
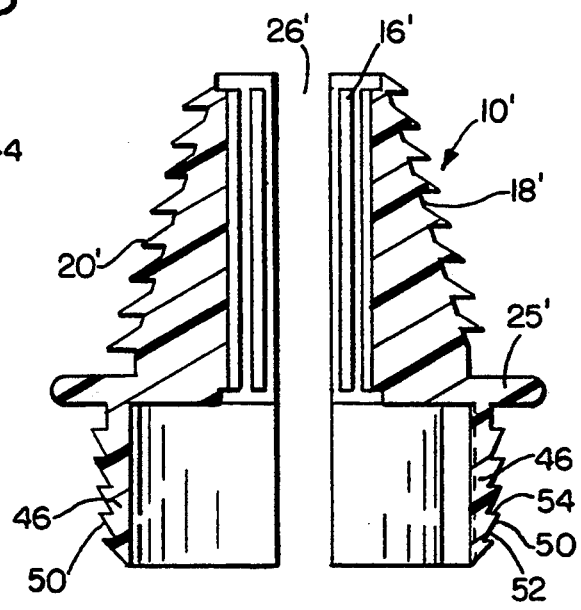
FIG. 8 is a longitudinal section through the clamp of FIG. 7, taken generally along the plane of the line 8—8 thereof.

The insulator clamp 10 shown in FIGS. 1–4 can be threaded into a hole in a sheet metal stud as well as a wooden stud or wallboard. However, since a standard size hole punch is normally used to punch holes in sheet metal studs to pass a conduit or pipe through sheet metal studs, another form of threaded insulator clamp 10′ in accordance with the present invention shown in FIGS. 5–8 may be provided with a second oppositely tapered exterior surface 44 on the back side of the radial flange 25′ facing in a direction opposite that of the first tapered exterior surface 18′ for use with sheet metal studs. The second tapered surface 44 (to the right of the flange 25′ in FIG. 5) is substantially smooth and is only slightly tapered, generally desirably forming about a 5° angle with the center line of the passage 14′. This serves to guide the clamp 10′ into a preformed opening in a metal stud or sheet metal member and to keep the clamp centered in the opening.

For a clamp 10′ designed to fit a standard 1⅜ inch punched hole, the second tapered surface 44 desirably has a maximum outside diameter where it meets the annular flange 25′ of approximately 1.40 inch and a minimum outside diameter at the axial outermost end of approximately 1.30 inch. Such a clamp 10′ may be used with a metal stud which has a maximum hole diameter up to 1.40 inch. If the hole diameter is 1.40 inch, the installer can push the second tapered surface 44 of the clamp through the hole until the stud or other sheet metal abuts against the back side of the annular flange 25′. Also, such a clamp 10′ may be used with studs having a hole diameter slightly less than that but not less than 1.30 inch. Even where all of the holes are made by the same size punch, after use over a period of time, the punch wears, resulting in some variation of hole size.

One or more retaining means are also provided for holding the second tapered surface 44 of the clamp 10′ in position in the sheet metal hole. In the embodiment shown in FIGS. 5–8, the retaining means comprises a pair of resiliently deformable legs 46 extending coaxially outwardly from the back side of the flange 25' diametrically opposite each other within longitudinal slots 48 formed in the second tapered surface 44. On the radial outer surface of the legs 46 are a plurality of barbs 50 (see FIGS. 5 and 8) having a height for example of approximately 0.050 inch so that the barbs project radially outward beyond the second tapered surface 44 a sufficient distance for accommodating various hole sizes. The leading edges 52 of the barbs 50 slope backward whereby as the second tapered surface 44 of the clamp is inserted into an opening in a metal stud, the leading edges 52 of the barbs 50 deflect the legs 46 radially inwardly to permit installation of the clamp. In contrast, the back edges 54 of the barbs 50 have sharp transverse faces which prevent removal of the second tapered surface of the clamp from the metal stud once installed.

The clamp 10' shown in FIGS. 5-8 is otherwise substantially the same as the clamp 10 shown in FIGS. 1-4, including a threaded exterior tapered surface 18' extending coaxially from the front side of the radial flange 25' which is designed to be screwed into a wider variation of hole sizes in other framing members such as wood studs or wallboard and the like. Accordingly, the same reference numerals followed by a prime symbol are used to designate like parts.

Regardless of which tapered surface 18' or 44 of clamp 10' is inserted into the hole, the clamp is first opened and placed over the pipe or conduit in the manner previously described. If the tapered surface 44 is used, the clamp 10' is grasped by the threaded surface 18' to push the tapered surface 44 into the hole until the clamp is firmly locked in place by the barbs 50 on the resiliently deformable legs 46. If the threaded exterior tapered surface 18' is used, the tapered surface 44 and/or resilient legs 46 are grasped between the installer's fingers and thumb similar to the tabs or finger grips 36 of the FIGS. 1-4 embodiment, and the clamp is manually rotated to screw the clamp into the hole until the clamp is pressed tight around the conduit in the manner previously described.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A clamp for installation in an opening in a structural member such as wallboard or a stud to support a pipe or conduit within such opening, said clamp having an interior surface defining an axially extending cylindrical passage through the clamp for receipt of a conduit, an exterior tapered surface for positioning the clamp in different size openings in the member, said exterior tapered surface having external threads to permit said exterior tapered surface to be screwed into an opening in the member, and a flange extending radially outward from the clamp adjacent a radial outer end of said exterior tapered surface.

2. The clamp of claim 1 further comprising gap means extending axially through one side of the clamp between interior and exterior surfaces thereof for enabling the clamp to be opened up for installation around a conduit.

3. The clamp of claim 22 further comprising an axially extending slot parallel to said gap, formed in an interior surface of said clamp opposite said gap which acts as a hinge when the clamp is opened up.

4. The clamp of claim 22 further comprising slot means extending through said threads and said flange, said threads having leading end faces and trailing end faces where said gap and said slot intersect said threads.

5. The clamp of claim 4 wherein said leading end faces of said threads are beveled to ease entry of said threads into an opening in the member.

6. The claim of claim 5 wherein said railing end faces of said threads are generally normal to a tangent to said exterior tapered surfaces so as to provide sharp, biting edges to resist removal of the clamp from an opening in the member.

7. The clamp of claim 1 further comprising tab means protruding axially outwardly from a back side of said flange for grasping by an installer's hand to facilitate turning of the clamp for ease of screwing of the exterior tapered surface into an opening in the member.

8. The clamp of claim 1 further comprising a smooth exterior tapered surface protruding axially outwardly from a back side of said flange for positioning the clamp in an opening in a metal structural member, and retaining means for securing said smooth exterior tapered surface within such an opening in such a metal structural member.

9. The clamp of claim 8 wherein said smooth exterior tapered surface has an axially extending opening, and said retaining means comprises a resilient leg extending axially within said opening and having at least one barb extending outwardly for engagement with the metal structural member.

10. The clamp of claim 9 wherein said leg extends from said flange in the same direction as said smooth exterior tapered surface.

11. The clamp of claim 9 wherein said leg has a plurality of barbs that project radially outwardly beyond said smooth exterior tapered surface.

12. A clamp for installation in an opening in a structural member such as wallboard or a stud to support a pipe or conduit within such opening, said clamp having an interior surface defining an axially extending cylindrical passage through the clamp for receipt of a conduit, and an exterior tapered surface for positioning the clamp in different size openings int he member, said exterior tapered surface having external threads to permit said exterior tapered surface to be screwed into an opening in the member, said threads having a first face which is inclined and a second face which is generally radial with respect to the axis of the passage, said first and second faces of said threads intersecting to form a helical edge.

13. A clamp for installation in an opening in a structural member such as wallboard or a stud to support a pipe or conduit within such opening, said clamp having an interior surface defining an axially extending passage through the clamp for receipt of a conduit, an exterior surface having a first tapered portion tapering toward one end of the clamp, coaxial therewith, for positioning the clamp in an opening int he member in a first axial direction, said first tapered portion having external threads for engaging the member when the clamp is installed in the member in a first axial direction, and the exterior surface having a second tapered portion tapering toward another end of the clamp, coaxial therewith, for positioning the clamp in an opening in the member in a second axial direction opposite the first axial direction, and retaining means for securing the clamp to the member when the clamp is installed in the member in the second axial direction.

14. The clamp of claim 13 wherein the exterior surface of said second tapered portion is substantially smooth and is more gradually tapered than the exterior surface of said first tapered portion.

15. The clamp of claim 13 further comprising a flange extending radially outward from the clamp between said first and second tapered portions, said flange and said retaining means engaging opposite surfaces of the member to secure the clamp in place when installed in the second axial direction.

16. The clamp of claim 15 further comprising an axially extending gap through one side of the clamp between interior and exterior surfaces thereof for enabling the clamp to be opened up for installation around a conduit, and an axially extending slot parallel to said gap, formed in an interior surface of said clamp opposite said gap which acts as a hinge when the clamp is opened up.

17. The clamp of claim 15 wherein said second tapered portion has an axially extending opening, and said retaining means includes resilient leg means extending axially from said flange within said opening, said resilient leg means having a plurality of barbs which project radially outward beyond the exterior surface of said second tapered portion.

18. The claim of claim 16 further comprising slot means extending coaxially through said threads formed in the exterior surface of said first tapered portion, said threads having leading end faces and trailing end faces where said gap and said slot means intersect said threads, said leading end faces of said threads being beveled to ease entry of said threads into the member.

19. The clamp of claim 18 wherein said trailing end faces of said threads are generally normal to a tangent to the exterior surface of said first tapered portion so as to provide sharp, biting edges to resist removal of the clamp from the member.

* * * * *